(12) United States Patent
Nava

(10) Patent No.: US 10,029,679 B2
(45) Date of Patent: Jul. 24, 2018

(54) CONTROLLING SKIDDING VEHICLES

(71) Applicant: Ford Global Technologies, LLC, Dearborn, MI (US)

(72) Inventor: Ivan Nava, Metepec (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 9 days.

(21) Appl. No.: 15/232,124

(22) Filed: Aug. 9, 2016

(65) Prior Publication Data

US 2018/0043883 A1    Feb. 15, 2018

(51) Int. Cl.
| | |
|---|---|
| *B60W 30/045* | (2012.01) |
| *G05D 1/00* | (2006.01) |
| *G05D 3/20* | (2006.01) |
| *G08G 1/16* | (2006.01) |

(Continued)

(52) U.S. Cl.
CPC ......... *B60W 30/045* (2013.01); *G05D 1/0061* (2013.01); *G05D 1/0223* (2013.01); *G05D 1/0236* (2013.01); *G05D 3/206* (2013.01); *G05D 13/62* (2013.01); *G08G 1/166* (2013.01); *B60W 2420/52* (2013.01); *B60W 2520/26* (2013.01); *B60W 2540/04* (2013.01); *B60W 2550/00* (2013.01); *B60W 2710/18* (2013.01); *B60W 2720/106* (2013.01); *B60W 2720/125* (2013.01); *B60W 2720/24* (2013.01)

(58) Field of Classification Search
CPC .......... B60W 30/045; B60W 2420/52; B60W 2520/26; B60W 2540/04; B60W 2550/00; B60W 270/18; B60W 2720/106; B60W 2720/125; B60W 2720/24; G05D 1/0061; G05D 1/0223; G05D 1/0236; G05D 3/206; G05D 13/62; G08G 1/166

USPC .......................................................... 701/41
See application file for complete search history.

(56) References Cited

U.S. PATENT DOCUMENTS

| | | | |
|---|---|---|---|
| 5,058,018 A * | 10/1991 | Kuwana | B60T 8/1764 303/149 |
| 5,089,967 A | 2/1992 | Haseda | |
| 7,374,014 B2 | 5/2008 | Yasui | |

(Continued)

FOREIGN PATENT DOCUMENTS

| | | |
|---|---|---|
| WO | WO-2014148979 A1 | 9/2014 |
| WO | WO-2016035665 A1 | 3/2016 |

OTHER PUBLICATIONS

Interview: Talking Autonomous Cars and Driver-Assist Advances With Ford's Greg Stevens, Feb. 2, 2016, by Mark Lelinwalla Tech Times.

*Primary Examiner* — Atul Trivedi
(74) *Attorney, Agent, or Firm* — David R. Stevens; Stevens Law Group

(57) ABSTRACT

The present invention extends to methods, systems, and computer program products for controlling skidding vehicles. In general, a vehicle adjusts its configuration to mitigate the skidding. The vehicle can recognize dynamic skid situations and apply strategies to avoid an accident. In response to a signal that a vehicle is in a specified type of skid, the vehicle's configuration can be automatically changed to recover from the skid. Different configuration changes can be used to recover from different skid types, including: oversteer, understeer and counter steer. Changing vehicle configuration can include utilizing vehicle systems such as, for example, steering, braking, cruise control, lane keeping, etc.

15 Claims, 6 Drawing Sheets

(51) Int. Cl.
    *G05D 1/02*         (2006.01)
    *G05D 13/62*      (2006.01)

(56) References Cited

U.S. PATENT DOCUMENTS

| | | | |
|---|---|---|---|
| 8,521,349 B2 | 8/2013 | Yu | |
| 8,554,414 B2* | 10/2013 | Koto | B60T 8/17554 |
| | | | 280/5.5 |
| 2006/0265114 A1* | 11/2006 | Thumrugoti | B60T 8/17554 |
| | | | 701/71 |
| 2010/0106374 A1* | 4/2010 | Miyajima | B60T 8/1755 |
| | | | 701/41 |
| 2011/0202241 A1* | 8/2011 | Le | B60R 21/0134 |
| | | | 701/46 |
| 2011/0241299 A1* | 10/2011 | Harada | B60T 8/1755 |
| | | | 280/5.513 |
| 2014/0022070 A1* | 1/2014 | Golomb | B60Q 1/0082 |
| | | | 340/475 |
| 2015/0224845 A1* | 8/2015 | Anderson | B60G 17/019 |
| | | | 701/37 |

\* cited by examiner (OVERSTEER)

(FISHTAIL)

(UNDERSTEER)

CONTROLLING SKIDDING VEHICLES

CROSS-REFERENCE TO RELATED APPLICATIONS

Not applicable.

BACKGROUND

1. Field of the Invention

This invention relates generally to the field of antiskid systems, and, more particularly, to controlling skidding vehicles.

2. Related Art

Accidents due to vehicle skidding are common. Skidding can occur under a variety of circumstances including when a driver oversteers or understeers going into a corner. Road conditions can also contribute to vehicle skidding. For example, vehicles are more susceptible to skidding in winter driving conditions where snow reduces visibility and ice makes roads slippery. Many drivers lack the necessary skills to properly handle vehicle skidding.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for controlling skidding vehicles.

In general, a vehicle adjusts its configuration to mitigate the skidding. In one aspect, a vehicle is equipped with a trigger on the steering wheel (or other adjacent location in the vehicle's cabin). The trigger allows the driver to manually pass control to the vehicle so that the vehicle can take automated measures to attempt (self) recovery from a skid. A driver can activate the trigger when he or she is unable to recover from a skid (e.g., lacks the driving skill) and/or when he or she simply desires for the vehicle handle a skid (even if the driver has the driving skill to regain control). In another aspect, the vehicle automatically detects when a skid is potentially uncontrollable and then takes automated measures to attempt (self) recovery from the skid.

The two mechanisms can also operate together. A vehicle can automatically detect a skid. The vehicle can allow some amount of time for the driver to correct the skid. If after a specified amount of time the skid is not corrected and/if the skid becomes more dangerous, the vehicle can take automated measures to attempt (self) recovery from the skid. At any time before the vehicle automatically takes over, the driver can activate the trigger to manually pass control to the vehicle. In response to trigger activation, the vehicle can take automated measures to attempt (self) recovery from the skid.

Automated mechanisms for skid recovery can include using various sensors, including LIDAR, to evaluate the vehicle's current configuration (e.g., acceleration, speed, wheel angles, etc.) and environment. Some of the sensors can sense out to a range of up to 200 meters, providing a relatively substantial view on the vehicle's environment (e.g., obstacles, other vehicles, pedestrians, lane lines, etc.). Depending on the vehicle's current configuration and environment, the vehicle's configuration can be automatically changed to recover from a skid.

In one aspect, the vehicle detects a type of skid, such as, an oversteer skid, a counter steer skid, or an understeer skid. Based on the detected skid type, the vehicle's configuration can be automatically changed to recover from a skid. Different configuration changes can be used to recover from different skid types. Changing configuration can include utilizing other vehicle systems such as, for example, steering, braking, cruise control, lane keeping, etc.

Accordingly, a vehicle can recognize dynamic skid situations and automatically apply strategies to avoid an accident.

Figure 1:
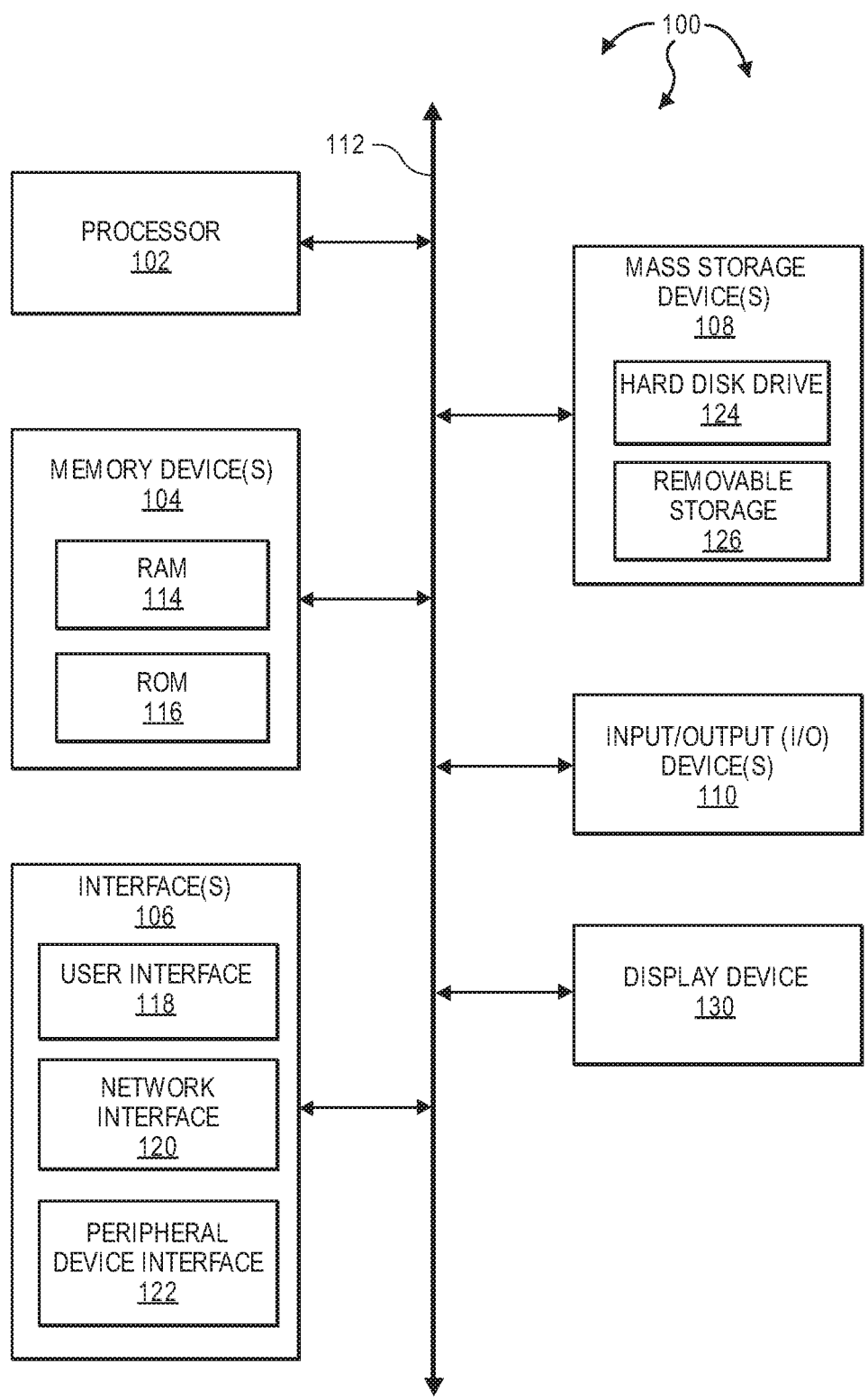
FIG. 1 illustrates an example block diagram of a computing device.

Aspects of the invention can be implemented in a variety of different types of computing devices. FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
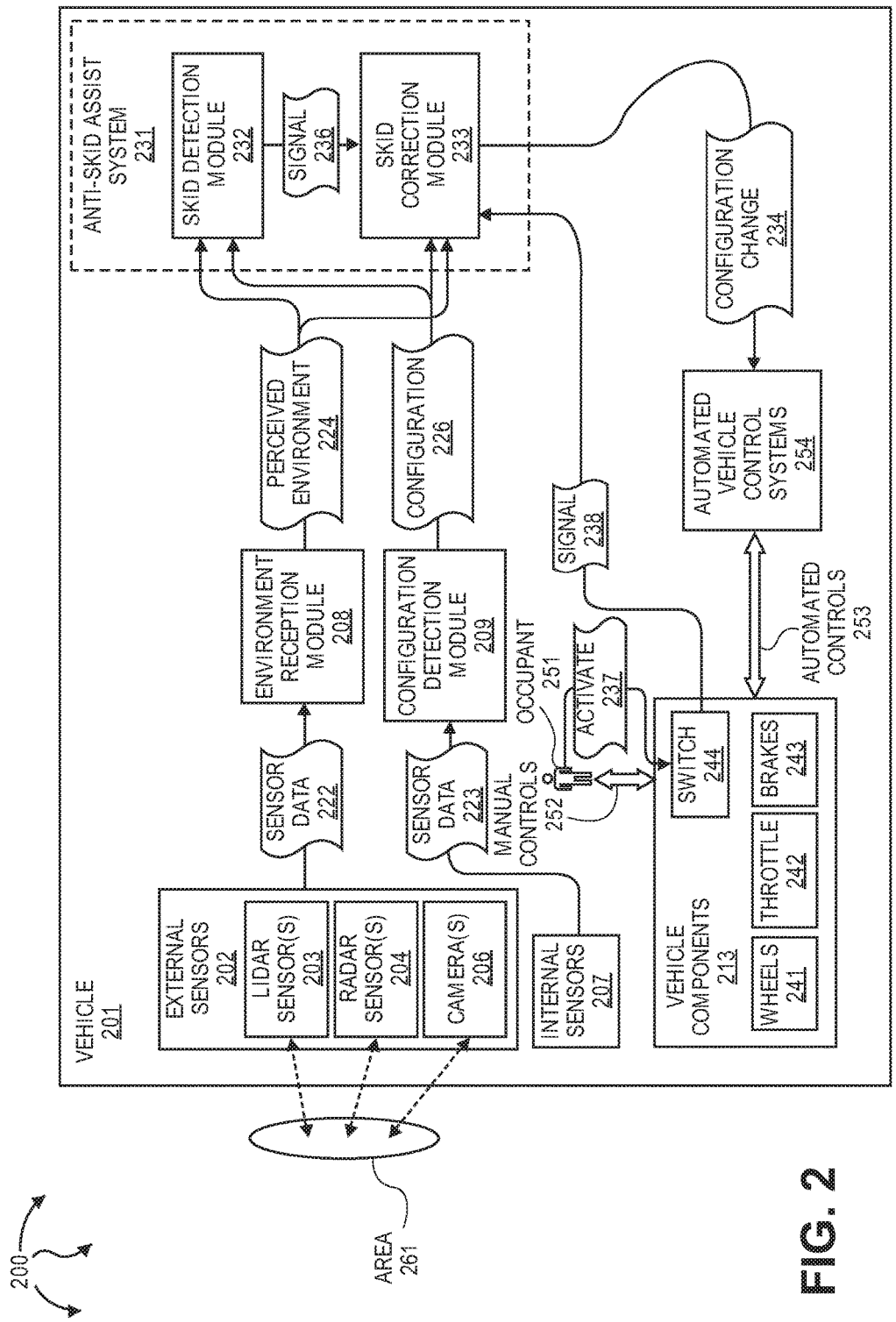
FIG. 2 illustrates an example environment that facilitates controlling a skidding vehicle.

FIG. 2 illustrates an example environment 200 that facilitates automatically controlling skidding vehicles. Environment 200 includes vehicle 201, such as, for example, a car, a truck, or a bus. Vehicle 201 can contain one or more occupants, such as, for example, occupant 251 (which may be a driver or passenger). Environment 200 also includes area 261. Area 261 can be an area around vehicle 201. Area 261 can include roadway markings (e.g., lane boundaries), pedestrians, other vehicles, signs, or any other types of objects.

Vehicle 201 includes external sensors 202, internal sensors 207, environment perception module 208, configuration detection module 209, vehicle components 213, anti-skid assist system 231, and automated vehicle control systems 254.

External sensors 202 include one or more of: LIDAR sensors 203, radar sensor(s) 204, and camera(s) 206. External sensors 202 may also include other types of sensors (not shown), such as, for example, acoustic sensors, ultrasonic sensors, and electromagnetic sensors. In general, external sensors 202 can sense and/or monitor objects in area 261. External sensors 202 can output sensor data 222 indicating the position and optical flow (i.e., direction and speed) of monitored objects.

From the sensor data 222, environment perception module 208 can perceive an environment in area 261. Perception module 208 can receive sensor data for objects within area 261. Perception module 208 can process the sensor data to identify objects of interest within area 261. Perception module 208 can use one or more perception algorithms to classify objects. Object classifications can include: lane boundaries, cross-walks, signs, control signals, cars, trucks, pedestrians, etc. Some object classifications can have sub-classifications. For example, a sign can be classified by sign type, such as, a stop sign, a yield sign, a school zone sign, a speed limit sign, etc. Perception module 208 can also determine the location of an object within area 261. If an object is moving, perception neural network module 208 can also determine a likely path of the object.

In one aspect, perception module 208 includes a neural network architected in accordance with a multi-layer (or "deep") model. A multi-layer neural network model can include an input layer, a plurality of hidden layers, and an output layer. A multi-layer neural network model may also include a loss layer. For classification of sensor data (e.g., an image), values in the sensor data (e.g., pixel-values) are assigned to input nodes and then fed through the plurality of hidden layers of the neural network. The plurality of hidden layers can perform a number of non-linear transformations. At the end of the transformations, an output node yields a perceived environment for objects within area 261.

Vehicle components 213 includes components of vehicle 201, such as, for example, wheels 241, throttle 242, brakes 243, switch 244, etc. For a car or truck, wheels 241 can include four or more wheels. Each wheel can have an attached tire that contacts the road surface. Vehicle components 213 can also include any of a plurality of other components found in vehicles, such as, for example, an engine, a transmission, exhaust, a battery (and other electrical system components), environmental control components, media system components, etc. In one aspect, switch 244 is a manually activated trigger (e.g., on a steering wheel) for passing control of the vehicle from occupant 251 to vehicle 201.

In general, internal sensors 207 are configured to monitor vehicle components 213. Internal sensors 207 can output sensor data 223 indicating settings for each of vehicle components 213. From the sensor data 223, configuration detection module 209 can detect a configuration for vehicle 201. A vehicle configuration can include vehicle acceleration/deceleration (via throttle 242), vehicle speed, vehicle direction of travel, steering angle for each of wheels 241, wheel rotation for each of wheels 241, application of brakes 243, etc.

Anti-skid assist system 231 includes skid detection module 232 and skid correction module 233. Based on a perceived environment and vehicle configuration, skid detection module 232 can detect if vehicle 201 is skidding. When skidding is detected, skid detection module 232 can also can classify the type of skid (e.g., wheel lockup, understeer, oversteer, counter steer skid (fishtailing), etc.).

In one aspect, skid detection module 232 includes a neural network architected in accordance with a multi-layer (or "deep") model. A multi-layer neural network model can include an input layer, a plurality of hidden layers, and an output layer. A multi-layer neural network model may also include a loss layer. For classification of a perceived environment and vehicle configuration, values in the perceived environment and vehicle configuration are assigned to input nodes and then fed through the plurality of hidden layers of the neural network. The plurality of hidden layers can perform a number of non-linear transformations. At the end of the transformations, an output node yields a value indicating whether or not vehicle 201 is skidding and, if so, the type of skid inferred by skid detection module 232.

When skid detection module 232 detects that vehicle 201 is skidding, skid detection module 232 can send a signal 236 indicating the type of skid to skid correction module 233. Skid correction module 233 can receive the signal 236 from skid detection module 232.

Occupant 251 (e.g., a driver) can use manual controls 252 to control vehicle components 213 when driving. For example, occupant 251 can use an acceleration pedal to control throttle 242, a steering wheel to control a steering angle for wheels 241, and a brake pedal to control brakes 243.

It may be that occupant 251 operates vehicle 201 in a manner that causes vehicle 201 to skid. If occupant 251 perceives recovery from skidding to be unlikely based his or her driving skill, occupant 251 can activate switch 244. In turn, switch 244 can send a signal 238 to skid correction module 233. Skid correction module 233 can receive the signal 238 from switch 244. The signal 238 indicates to skid correction module 233 that vehicle 201 is skidding and occupant 251 has requested assistance recovering from the skidding.

Skid correction module 233 can request the type of skid from skid detection module 232. Based on the request from skid correction module 233, skid detection module 232 can infer a type of skid (as previously described). Skid detection module 232 can send a signal 236 indicating the type of skid back to skid correction module 233.

Skid correction module 233 can include algorithms for addressing different types, severity, and durations of skidding (e.g., wheel lockup, over steer, under steer, counter skid (fishtailing), etc.). Addressing skidding for vehicle 201 can include formulating a configuration change to change the configuration of vehicle 201. Based on a perceived environment in area 261 and a vehicle configuration for vehicle 201, skid correction module 233 can formulate a configuration change to mitigate an indicated type of skid. Mitigating skidding reduces the possibility of damage to vehicle 201.

Automated vehicle control systems 254 include systems for automatically controlling vehicle components 213. Automated vehicle control systems 254 can use automated controls 253 to control vehicle components 213. For example, a cruise control system can be used to control throttle 242, a collision avoidance system can be used to control brakes 243, etc. In one aspect, vehicle 201 includes systems for fully autonomous driving. Switch 244 can be activated to switch from manual driving mode to autonomous driving mode (which in addition to mitigating skids can perform a variety of other driving functions). In autonomous driving mode, automated vehicle control systems 254 essentially have complete control of vehicle components 213.

Skid correction module 233 can send a configuration change 234 to mitigate skidding to automated vehicle control systems 254. Automated vehicle control systems 254 can receive the configuration change 234 from skid correction module 233. Automated vehicle control systems 254 can use automated controls 253 to change one or more of vehicle components 213 to implement the configuration change. A configuration change can include reducing throttle 242, increasing throttle 242, releasing brakes 243, reducing brakes 243, increasing brakes 243, changing steering angle for one or more of wheels 241, etc.

In some aspects, either of switch 244 or skid detection module 232 can request that skid correction module 233 provide automated assistance to mitigate skidding. Based on driving skill, occupant 251 may be able to mitigate various types and/or severity of skids by changing the configuration of vehicle components 213 with manual controls 252. If at any time occupant 251 feels he or she lacks the driving skill to mitigate skidding, occupant 251 can activate switch 244 to request automated assistance to mitigate the skidding.

Skid detection module 232 can be configured to automatically intervene to mitigate skids when skid severity exceeds a specified severity and/or skid duration last longer than a specified period of time (even if switch 244 is not activated). When skid detection module 232 detects skidding, skid detection module 232 can monitor the skidding to determine if skid severity exceeds the specified severity. If so, skid detection module 232 signals skid correction module 233 to provide automated assistance to mitigate the skidding.

If not, skid detection module 232 continues to monitor the skidding at designated intervals. At each designated interval, skid detection module 232 determines if skid severity is increasing or decreasing. If skid severity does not begin to decrease (e.g., occupant 251 begins to get the skidding under control) within the specified period of time, skid detection module 232 signals skid correction module 233 to provide automated assistance to mitigate the skidding. Alternately, if skid duration exceeds the specified period of time, skid detection module 232 signals skid correction module 233 to provide automated assistance to mitigate the skidding. Additionally, if at any time during monitoring, the skid severity increases to exceed the specified severity, skid detection module 232 signals skid correction module 233 to provide automated assistance to mitigate the skidding.

On the other hand, if skid severity begins to decrease within the specified period of time and does not exceed the specified severity, occupant 251 is permitted to mitigate the skidding using manual controls 252 (if he or she desires to do so).

Figure 3:
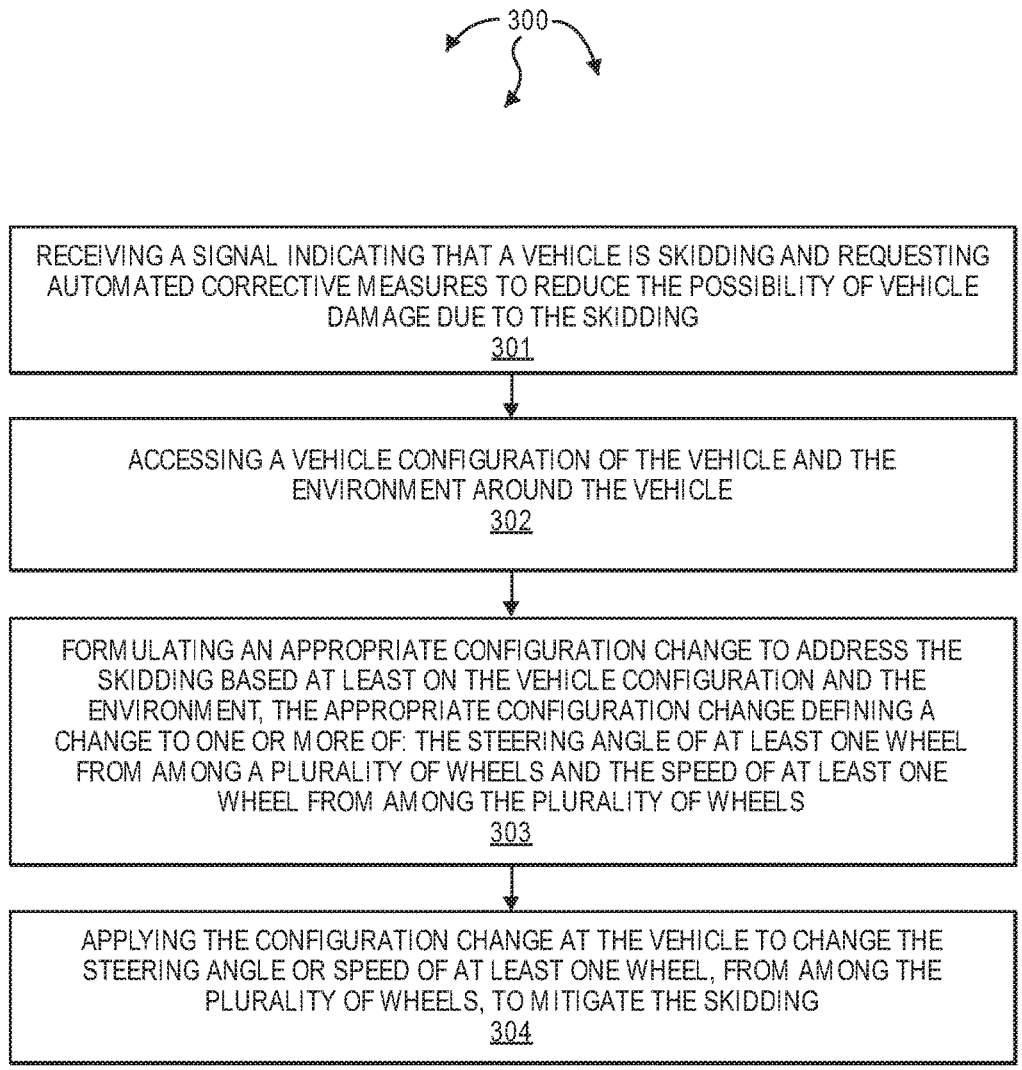
FIG. 3 illustrates a flow chart of an example method for controlling a skidding vehicle.

FIG. 3 illustrates a flow chart of an example method 300 for controlling a skidding vehicle. Method 300 will be described with respect to the components and data of environment 200.

Method 300 includes receiving a signal indicating that the vehicle is skidding and requesting automated corrective measures to reduce the possibility of vehicle damage due to the skidding (301). For example, skid correction module 233 can receive signal 238. During operation of vehicle 201, occupant 251 can determine that vehicle 201 is skidding and that he or she lacks the driving skill to mitigate the skidding. Occupant 251 can activate 237 switch 244. Activation of switch 244 sends signal 238 to skid correction module 233. Signal 238 indicates to skid correction module 233 that vehicle 201 is skidding and that an occupant has requested automated corrective measures to reduce the possibility of damage to vehicle 201 due to the skidding.

Alternately or in combination, external sensors 202 can acquire sensor data 222 from area 261. For example, LIDAR sensor(s) 203 can scan an area 360 degrees around vehicle 201 out to a distance of up to 200 meters. Environment perception module 208 can perceive perceived environment 224 within area 261.

Additionally, internal sensors 207 can acquire sensor data 223 from vehicle components 213. Configuration detection module 209 can detect configuration 226 from sensors data 223.

From perceived environment 224 and configuration 226, skid detection module 232 can determine that vehicle 201 is skidding. Further, skid detection module 232 can determine that the severity of the skid exceeds a specified severity and/or that vehicle 201 has been skidding for longer than a specified period to time. In response, skid detection module 232 can send signal 236 to skid correction module 233. Signal 236 indicates to skid correction module 233 that vehicle 201 is skidding and that automated corrective measures are requested to reduce the possibility of damage to vehicle 201 due to the skidding. Signal 236 can also indicate a skid type to skid correction module 233.

In one aspect, in response to receiving signal 238, skid correction module 233 requests a skid type from skid detection module 232. As such, skid correction module 233 can obtain a skid type (e.g., wheel lockup, understeer, oversteer, counter steer skid (fishtailing), etc.) when skid detection module 232 has not otherwise intervened.

Method 300 includes accessing a vehicle configuration of the vehicle and the environment around the vehicle (302). For example, skid correction module 233 can access perceived environment 224 from environment perception module 208. Skid correction module 233 can also access configuration 226 from configuration detection module 209.

Method 300 includes formulating an appropriate configuration change to address the skidding based at least on the vehicle configuration and the environment, the appropriate configuration change defining a change to one or more of: the steering angle of at least one wheel from among a plurality of wheels and the speed of at least one wheel from among the plurality of wheels (303). For example, based on configuration 226 and perceived environment 224, skid correction module can formulate configuration change 234 to address the skidding of vehicle 201. Configuration change 234 can define a change to one or more of: the steering angle of at least one of wheels 241 and the speed of at least one of wheels 241.

Skid correction module 233 can send configuration change 234 to automated vehicle control systems 254. Automated vehicle control systems 254 can receive configuration change 234 from skid correction module 233.

Method 300 includes applying the configuration change at the vehicle to change the steering angle or speed of at least one wheel, from among the plurality of wheels, to mitigate the skidding (304). For example, automated vehicle control systems 254 can use automated controls 253 to apply configuration change 234 to vehicle components 213. Applying configuration change 234 can change the steering angle or speed of at least one of wheels 241 to mitigate the skidding of vehicle 201. Changing a steering angle of at least one of wheels 241 can include changing the configuration of a steering wheel. Changing the speed of at least one of wheels 241 can include one or more of: increasing throttle 242, decreasing throttle 242, releasing brakes 243, reducing brakes 243, or increasing brakes 243.

Skid correction module 233 can formulate different configuration changes based on one or more of: skid type, skid severity, skid duration, vehicle type (e.g., front wheel drive, rear wheel drive, all-wheel drive, 4-wheel drive, car, truck, etc.) etc. Skid correction module 233 can formulate a plurality of different configuration changes (based on different skid recovery strategies) throughout a skid duration to attempt to bring vehicle 201 under control. Skid correction module 233 can dynamically change/update configuration changes throughout a skid duration based on changes in the perceived environment. In some aspects, during a skid, other systems of vehicle 201 can also have access to change vehicle components 213. Thus, skid correction module 233 can also dynamically change/update configuration changes throughout a skid duration based on other changes to vehicle components 213.

Oversteer occurs when a vehicle is going too fast for conditions and applies brakes while turning a corner. The braking shifts weight off of the rear tires and onto the front tires. The rear tires can skid due to the weight reduction. Oversteer can also happen going downhill around corners.

Figure 4A:
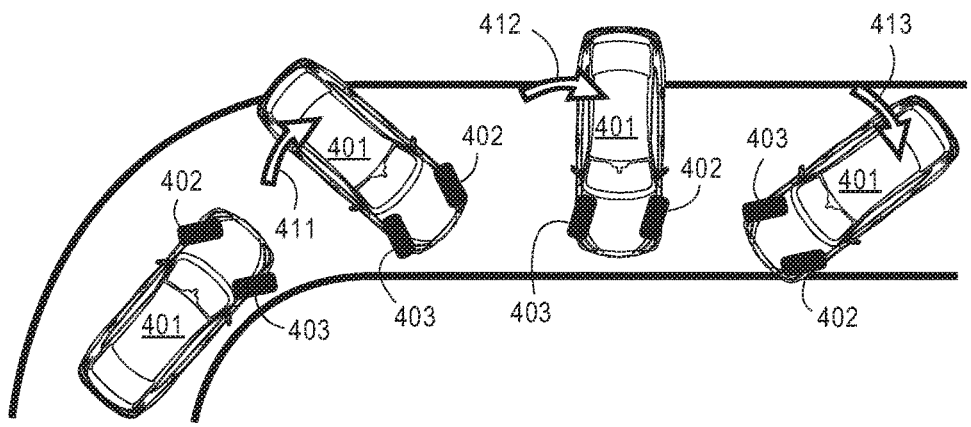
FIGS. 4A and 4B illustrate an example of an unmitigated oversteer skid and a corresponding mitigated oversteer skid.
Figure 4B:
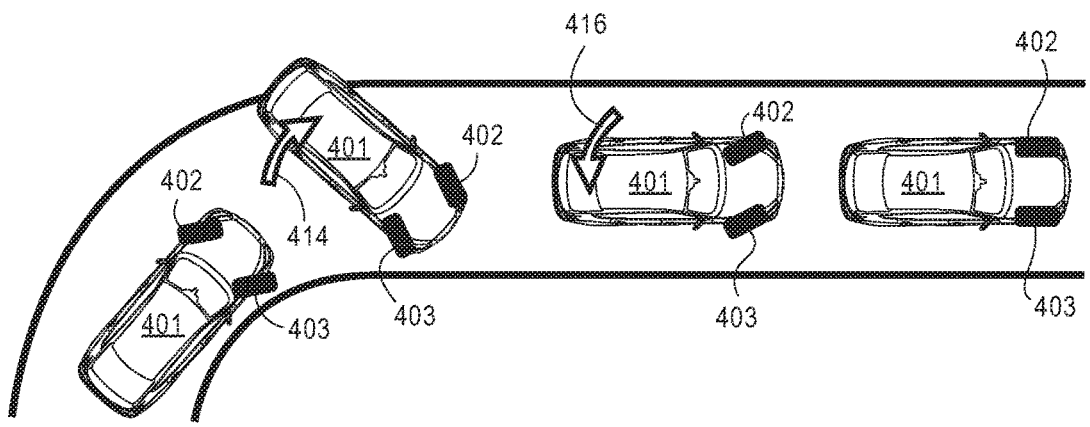

FIGS. 4A and 4B illustrate an example of an unmitigated oversteer skid and a corresponding mitigated oversteer skid. In FIG. 4A, vehicle 401 attempts to turn right (as indicated by front wheels 402 and 403) but is going too fast. As such, the brakes are applied to slow before making the turn. However, application of the brakes shifts additional weight off of the rear wheels of vehicle 401 and onto wheels 402 and 403. With less weight on the rear wheels, tires mounted to the rear wheels lose grip causing the rear of vehicle 401 to move as indicated by arrows 411, 412, and 413.

A strategy for mitigating an oversteering skid can include releasing the brakes and possibly a small amount of acceleration to put weight back on the rear wheels to stop them from sliding. In FIG. 4B, vehicle 401 includes components similar to those of vehicle 201. For example, vehicle 401 can include a skid correction module configured to implement a strategy for mitigating an oversteer skid. Thus, if a driver of vehicle 401 lacks the driving skill to implement the strategy, the skid correction module can assist (or even intervene) to mitigate the oversteer skid.

In FIG. 4B, similar to FIG. 4A, vehicle 401 attempts to turn right (as indicated by front wheels 402 and 403) but is going too fast. As such, the brakes are applied to slow before making the turn. Application of the brakes shifts additional weight off of the rear wheels of vehicle 401 and onto front wheels 402 and 403. With less weight on the rear wheels, the rear tires lose grip causing the rear of vehicle 401 to move as indicated by arrow 414. However, the skid correction module changes the configuration of vehicle 401 to return weight to the rear wheels and change the steering angle of wheels 402 and 403. For example, the skid correction module can apply slight acceleration to return weight to the rear wheels. The change in configuration permits the driver to regain control of vehicle 401 as indicated by arrow 416.

A counter steer skid (fishtail) can occur when a driver has met with oversteer and failed to appropriately correct. The rear end of the vehicle can skid back and forth, potentially building momentum with each swing. If not corrected on the first or second skid, subsequent skids can be more violent and difficult to recover from. Counter steer skids can occur when drivers correct late, overcorrect, and repeat the mistake.

Figure 5A:
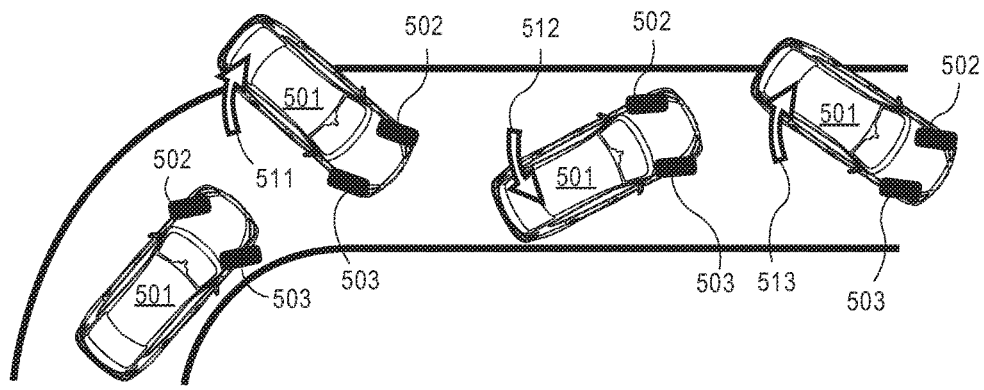
FIGS. 5A and 5B illustrate an example of an unmitigated counter steer skid (fishtail) and a corresponding mitigated counter steer skid.
Figure 5B:
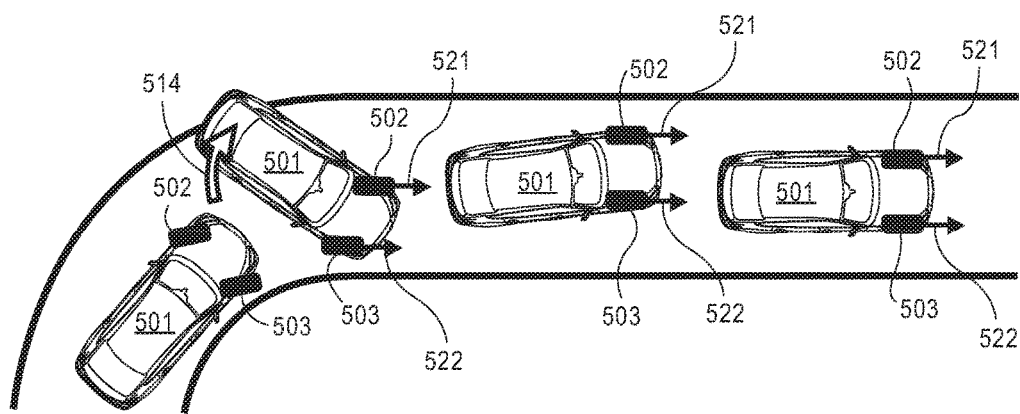

FIGS. 5A and 5B illustrate an example of an unmitigated counter steer skid (fishtail) and a corresponding mitigated counter steer skid. In FIG. 5A, vehicle 501 attempts to turn right (as indicated by front wheels 502 and 503) but is going too fast. As such, the brakes are applied to slow before making the turn. However, application of the brakes shifts additional weight off of the rear wheels of vehicle 501 and onto front wheels 502 and 503. With less weight on the rear wheels, the rear tires lose grip causing the rear of vehicle 501 to move as indicated by arrows 511. The driver of vehicle 501 fails to compensate appropriately causing the rear of vehicle 501 to move in the other direction as indicated by arrow 512. The driver of vehicle 501 again fails to compensate appropriately causing the rear of vehicle 501 to move in the other direction as indicated by arrow 513.

A strategy for mitigating counter steer is to limit corrective steering to point the front tires in the direction the car is to go. The wheel is straightening as the vehicle straightens so that the wheels are also pointed down the road. In FIG. 5B, vehicle 501 includes components similar to those of vehicle 201. For example, vehicle 501 can include a skid correction module configured to implement the strategy for mitigating counter steer skids. Thus, if a driver of vehicle 501 lacks the driving skill to implement the strategy, the skid correction module can assist (or even intervene) to mitigate counter steer skidding.

In FIG. 5B, similar to FIG. 5A, vehicle 501 attempts to turn right (as indicated by front wheels 502 and 503) but is going too fast. As such, the brakes are applied to slow before making the turn. Application of the brakes shifts additional weight off of the rear wheels of vehicle 501 and onto front wheels 502 and 503. With less weight on the rear wheels, the rear tires lose grip causing the rear of vehicle 501 to move as indicated by arrow 514. However, the skid correction module changes the configuration of vehicle 501 to return weight to the rear wheels. The skid correction module also maintains the steering angle of wheels 502 and 503 to remain pointed down the roadway as indicated by arrows 521 and 522. The change in configuration permits the driver to regain control of vehicle 501.

In one aspect, a skid detection module at vehicle 501 monitors skid type, skid severity, and skid duration for vehicle 501. The skid detection module may initially permit the driver of vehicle 501 to attempt corrective action to mitigate the counter steer skidding. For example, skid detection module can monitor the skids indicated by arrows 511 and 512. However, after monitoring the skid indicated by arrow 512, the skid detection module signals the skid correction module to intervene (even if the driver has not requested assistance with the counter steer skids via a manual switch).

Understeer occurs when front tires lose grip and a vehicle is unable to turn a corner. Understeer can occur when a vehicle approaches a turn going too fast. Spinning the front tires or locking the front tires in a corner can also cause understeer.

Figure 6A:
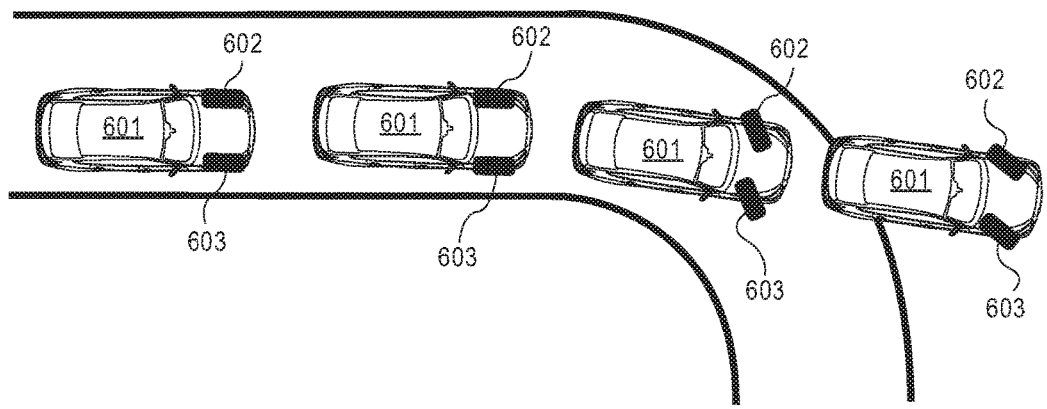
FIGS. 6A and 6B illustrate an example of an unmitigated understeer skid and a corresponding mitigated understeer skid.
Figure 6B:
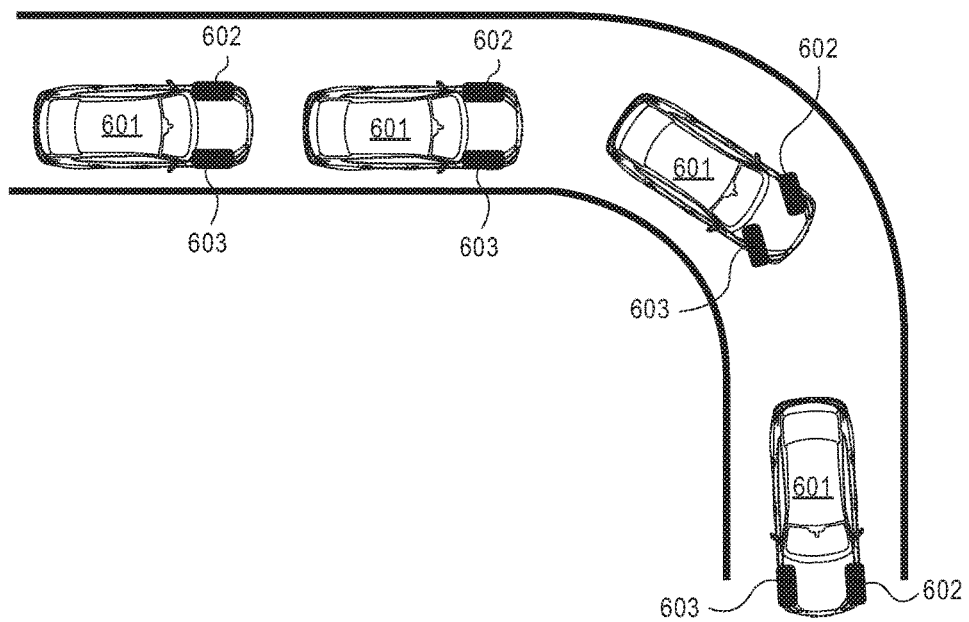

FIGS. 6A and 6B illustrate an example of an unmitigated understeer skid and a corresponding mitigated understeer skid. In FIG. 6A, vehicle 601 attempts to turn right (as indicated by front wheels 602 and 603) but is going too fast based on roadway conditions. As such, front wheels 602 and 603 lose grip with the roadway, causing vehicle 601 to miss the turn.

A strategy for mitigating understeer is to let off the accelerator and gently apply the brakes. Applying the brakes shifts some weight off the rear wheels onto the front wheels. The additional weight on the front tires can help the front tires better grip the roadway. In FIG. 6B, vehicle 601 includes components similar to those of vehicle 201. Vehicle 601 can include a skid correction module configured to implement the strategy for mitigating understeer skids. Thus, if a driver of vehicle 601 lacks the driving skill to implement the strategy, the skid correction module can assist (or even intervene) to mitigate understeer skidding.

In FIG. 6B, similar to FIG. 6A, vehicle 601 attempts to turn right (as indicated by front wheels 602 and 603) but is going too fast. Vehicle 601 starts an understeer skid. However, the skid correction module changes the configuration of vehicle 501 to shift weight to front wheels 602 and 603. For example, the skid correction module can apply the brakes to shift additional weight onto front wheels 602 and 603. With additional weight on front wheels 602 and 603, the front tires (mounted to front wheels 602 and 603) are better able to grip the roadway. As such, the change in configuration permits the driver to regain control of vehicle 601. Vehicle 601 remains on the roadway and makes the turn.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, sensor data, perceived environments, vehicle configurations, switch activations, signals, configuration changes, skid types, skid severity, skid duration, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, sensor data, perceived environments, vehicle configurations, switch activations, signals, configuration changes, skid types, skid severity, skid duration, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed:

1. A method for controlling a vehicle that is skidding, the method comprising:
    receiving a request for automated corrective measures to control the skidding from an operator of the vehicle through an operator actuated switch dedicated to invoking the automated corrective measures to control the skidding;
    formulating a configuration change for changing the configuration of at least one vehicle component in response to the request; and
    applying the configuration change at the vehicle to change the configuration of the at least one vehicle component to mitigate the skidding.

2. The method of claim 1, wherein formulating a configuration change for changing the configuration of at least one vehicle component comprises formulating a configuration change to address one of: an oversteer skid, an understeer skid, or a counter steer skid.

3. The method of claim 1, wherein formulating a configuration change for changing the configuration of at least one vehicle component comprises formulating a configuration change based on a perceived environment surrounding the vehicle, the perceived environment inferred from sensor data acquired from one or more LIDAR sensors.

4. The method of claim 1, wherein applying the configuration change at the vehicle to change the configuration of the at least one vehicle component comprises applying the configuration change to change one or more of: the steering angle of a wheel of the vehicle, braking at the vehicle, and acceleration at the vehicle.

5. A vehicle, the vehicle comprising:
    one or more sensors for sensing operation of the vehicle and sensing the environment surrounding the vehicle out to a specified range;
    a plurality of wheels;
    one or more processors;
    a manually actuated switch dedicated to invoking automated corrective measures to control the skidding, the manually actuated switch being mounted to a steering wheel of the vehicle;
    system memory coupled to one or more processors, the system memory storing instructions that are executable by the one or more processors;
    the one or more processors configured to execute the instructions stored in the system memory to control the vehicle in a skid, including the following:
        receive a signal from the manually actuated switch indicating that a user has actuated the switch;

access a vehicle configuration of the vehicle and the environment around the vehicle;

formulate an appropriate configuration change to address the skidding based at least on the vehicle configuration and the environment, the appropriate configuration change defining a change to one or more of: the steering angle of at least one wheel from among the plurality of wheels and the speed of at least one wheel from among the plurality of wheels; and apply the configuration change at the vehicle to change the steering angle or speed of at least one wheel, from among the plurality of wheels, to mitigate the skidding.

6. The vehicle of claim 5, further comprising the one or more processors configured to execute the instructions stored in the system memory to:

detect the vehicle configuration from sensor data, the sensor data acquired from sensors monitoring components of the vehicle; and perceive the environment around the vehicle from other sensor data, the other sensor data acquired from sensors monitoring an area around the vehicle.

7. The vehicle of claim 6, wherein the one or more processors configured to execute the instructions stored in the system memory to perceive the environment around the vehicle from other sensor data comprise the one or more processors configured to execute the instructions stored in the system memory to perceive the environment around the vehicle from other sensor data acquired from one or more LIDAR sensors.

8. The vehicle of claim 5, wherein the one or more processors configured to execute the instructions stored in the system memory to formulate an appropriate configuration change to address the skidding comprise the one or more processors configured to execute the instructions stored in the system memory to formulate an appropriate configuration change address one of: an oversteer skid, an understeer skid, or a counter steer skid.

9. The vehicle of claim 5, wherein the one or more processors configured to execute the instructions stored in the system memory to access a vehicle configuration of the vehicle comprise the one or more processors configured to execute the instructions stored in the system memory to access an indication that the duration of the skidding has exceed a specified period of time.

10. The vehicle of claim 5, wherein the one or more processors configured to execute the instructions stored in the system memory to access a vehicle configuration of the vehicle comprise the one or more processors configured to execute the instructions stored in the system memory to access an indication that the severity of the skidding has exceed a threshold severity.

11. The vehicle of claim 10, wherein the one or more processors configured to execute the instructions stored in the system memory to apply the configuration change at the vehicle comprise the one or more processors configured to execute the instructions stored in the system memory to override manual operation of the vehicle to apply the configuration change at the vehicle.

12. The vehicle of claim 10, wherein the one or more processors configured to execute the instructions stored in the system memory to apply the configuration change at the vehicle comprise the one or more processors configured to execute the instructions stored in the system memory to change one of: acceleration at the vehicle or braking at the vehicle.

13. A method for automatically controlling a skidding vehicle, the vehicle including a plurality of wheels, the method comprising:

receiving a signal from a manually actuated switch dedicated to invoking automated corrective measures to control the skidding, the signal indicating that the vehicle is skidding and requesting automated corrective measures to reduce the skidding;

accessing a vehicle configuration of the vehicle and the environment around the vehicle by evaluating input from the one or more sensors;

formulating an appropriate configuration change to address the skidding based at least on the vehicle configuration and the environment, the appropriate configuration change defining a change to one or more of: the steering angle of at least one wheel from among the plurality of wheels and the speed of at least one wheel from among the plurality of wheels; and applying the configuration change at the vehicle to change the steering angle or speed of at least one wheel, from among the plurality of wheels, to mitigate the skidding.

14. The method of claim 13, wherein formulating an appropriate configuration change to address the skidding comprises formulating an appropriate configuration change to address one of: oversteer skidding, understeer skidding, or counter steer skidding.

15. The method of claim 13, wherein applying the configuration change at the vehicle comprises changing one of: acceleration at the vehicle or braking at the vehicle.

* * * * *